United States Patent
Yoshida et al.

(10) Patent No.: US 11,951,580 B1
(45) Date of Patent: Apr. 9, 2024

(54) COOLANT PROCESSING APPARATUS

(71) Applicant: Matsuura Machinery Corporation, Fukui (JP)

(72) Inventors: Mitsuyoshi Yoshida, Fukui (JP); Masaaki Uryu, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 0 days.

(21) Appl. No.: 18/465,035

(22) Filed: Sep. 11, 2023

(30) Foreign Application Priority Data

Sep. 15, 2022 (JP) ................. 2022-146904

(51) Int. Cl.
*B23Q 11/10* (2006.01)
*B01D 21/00* (2006.01)
*B01D 21/02* (2006.01)

(52) U.S. Cl.
CPC ...... *B23Q 11/1069* (2013.01); *B01D 21/0018* (2013.01); *B01D 21/02* (2013.01); *B01D 2221/14* (2013.01)

(58) Field of Classification Search
None
See application file for complete search history.

(56) References Cited

U.S. PATENT DOCUMENTS 6,338,795 B1* 1/2002 Okajima ............ B01D 21/0042
    210/167.04
10,809,015 B2 10/2020 Yamamoto 2011/0000862 A1* 1/2011 Semba .................. E03F 5/14
    210/304
2020/0122282 A1* 4/2020 Kobayashi ........... B01D 21/003
2022/0314385 A1* 10/2022 Naramoto .......... B23Q 11/1015

FOREIGN PATENT DOCUMENTS

| JP | S51-25349 | 3/1976 |
| JP | H07-7713 U | 2/1995 |
| JP | 2002-89479 | 3/2002 |

(Continued)

OTHER PUBLICATIONS

Japanese Office Action from Japanese Application No. 2022-146904 dated Nov. 15, 2022.

(Continued)

*Primary Examiner* — Bradley R Spies
*Assistant Examiner* — Jeannie McDermott
(74) *Attorney, Agent, or Firm* — Beyer Law Group LLP (57) ABSTRACT

A coolant processing apparatus removes sludge from a coolant discharged from a machine tool. The coolant processing apparatus includes a first reservoir and a second reservoir provided in a tank for retaining the coolant. The first reservoir includes a flow path in which the discharged coolant flows, and a portion downstream of the flow path to retain the coolant such that the sludge remains in the first reservoir. The flow path has at least one bend to bend a flow of the coolant at least once in a horizontal direction. The second reservoir retains the coolant flowing out from the first reservoir. A boundary wall is provided between the first and second reservoirs, at a location downstream of the at least one bend of the flow path, and has such a height that allows a supernatant of the coolant in the first reservoir to flow into the second reservoir.

10 Claims, 7 Drawing Sheets

(56) References Cited

FOREIGN PATENT DOCUMENTS

| | | |
|---|---|---|
| JP | 4729589 B2 * | 7/2011 |
| JP | 2012-045678 | 3/2012 |
| JP | 6133528 | 4/2017 |
| JP | 6196409 | 8/2017 |
| JP | 2021-109131 | 8/2021 |
| JP | 2022-7259 | 1/2022 |
| WO | 2015/107826 | 7/2015 |
| WO | WO-2019058719 A1 * | 3/2019 ............ B23Q 11/00 |

OTHER PUBLICATIONS

Japanese Patent Grant from Japanese Application No. 2022-146904 dated Jan. 10, 2023.

\* cited by examiner

COOLANT PROCESSING APPARATUS

CLAIM OF PRIORITY

This application claims benefit of Japanese Patent Application No. 2022-146904 filed on Sep. 15, 2022, which is hereby incorporated by reference.

BACKGROUND OF THE INVENTION

1. Field of the Invention

The present disclosure relates to a coolant processing apparatus configured to remove sludge from a coolant that is discharged from a machine tool and that includes the sludge.

2. Description of the Related Art

A coolant used in various machine tools such as a machining center include chips and sludge discharged in the course of processing. After separation or removal of these chips and sludge from the coolant by a filter or the like provided in a coolant processing apparatus, the coolant is circulated into the machine tool. In the case where the chips and sludge remain in the coolant, the sludge may be accumulated in a tank for the coolant. This increases the load of cleaning and may cause the chips and the sludge to adhere to a processed surface. This may lower the processing quality or may damage the machine tool. Various techniques have accordingly be proposed to remove the chips and the sludge from the coolant.

For example, Japanese Patent Application Publication No. JP 2022-7259A discloses a technique that temporarily draws up a cutting fluid from a flow path of the cutting fluid to remove sludge and returns the cutting fluid after removal of the sludge to the flow path, with a view to preventing accumulation of the sludge. Japanese Patent No. JP 6133528B discloses a technique that forms a curved wall in a tank for a coolant to allow the flow of the coolant to smoothly change the direction at a corner of the tank, with a view to preventing accumulation of the sludge at the corner or the like of the tank. Japanese Patent No. JP 6196409B discloses a technique that injects and stirs a coolant in a tank for the coolant, with a view to preventing accumulation of the sludge.

SUMMARY OF THE INVENTION

The sludge is, however, very fine and small and may not be sufficiently removed by the filter. The prior art configurations may suppress accumulation of sludge, but there is still a room for improvement in terms of effective removal of sludge. By taking into account such a problem described above, an object of the present disclosure is to enable sludge to be effectively removed from a coolant.

According to one aspect of the present invention, there is provided a coolant processing apparatus configured to remove sludge from a coolant that is discharged from a machine tool and that includes the sludge. The coolant processing apparatus comprises a first reservoir provided inside of a tank for the coolant and configured to retain the coolant therein such as to cause the sludge to remain; a second reservoir provided adjacent to the first reservoir and configured to retain therein the coolant flowing out from the first reservoir; and a boundary wall provided to configure a boundary between the first reservoir and the second reservoir and to have a height that allows a supernatant of the coolant retained in the first reservoir to flow out to the second reservoir.

The configuration of this aspect causes the sludge to remain or stay in the first reservoir and not to flow out by means of the boundary wall and allows only the supernatant of the coolant to be flowed out to the second reservoir. This configuration accordingly allows for removal of the sludge. The state that the sludge "remains" or "stays" herein denotes a state that the sludge precipitates or is accumulated in the coolant and a state prior to such precipitation, i.e., a state that the sludge floats and drifts in part of the coolant other than the supernatant.

It is very difficult to effectively remove fine sludge that has the size of less than approximately 400 micrometers, by means of a filter. The configuration of this aspect, however, enables such fine sludge to be effectively removed without using a filter. One of the problems in the coolant-relating field is accumulation of sludge in a tank for the coolant. The configuration of this aspect, on the contrary, takes advantage of this nature of the sludge that sinks down in the coolant, to remove the sludge.

The configuration of this aspect is implemented by simply placing the boundary wall inside of the tank for the coolant to provide the first reservoir and the second reservoir. Another advantage of this aspect is thus to take advantage of the general structure of a prior art coolant processing apparatus without changing the size of the entire apparatus.

According to the above aspect of the present invention, the location and the height of the boundary wall may be determined, for example, by analysis based on, for example, simulation of the flow velocity or flow rate of the coolant in the tank for the coolant or by experiment.

A filter may be provided on an upstream side of the first reservoir to remove chips and relatively large sludge.

It is preferable not to provide a blocking plate in the first reservoir at a location that is likely to affect the flow of the coolant on the boundary wall. The blocking plate herein denotes a plate that prevents the flow on an upper surface thereon and that is open only in the vicinity of a bottom surface. Such a blocking plate is used to remove, for example, chips floating and drifting in the coolant and sludge that is more likely to be accumulated. At a location where the blocking plate is placed, however, the coolant flows in a narrow flow path in the vicinity of the bottom surface and tends to increase the flow velocity. This may prevent very fine sludge from staying in the first reservoir and may thus interfere with the effectiveness of removing the fine sludge. In order to avoid such a potential trouble, in the configuration of this aspect, it is preferable not to provide a blocking plate or to provide a blocking plate at a location farther from the boundary wall not to affect the flow of the coolant.

According to one aspect of the present invention, in the coolant processing apparatus of the above aspect, the boundary wall may have a height that decreases a flow velocity of the coolant in the first reservoir at least partly to a level that causes the sludge to be accumulated.

The configuration of this aspect further suppresses the sludge from being contained in the supernatant. Additionally, this configuration does not expand the location where the sludge precipitates and is accumulated, to the inside of the entire tank for the coolant but limits the location to the inside of the first reservoir. This configuration thus advantageously reduces the load of cleaning inside of the tank. The height of this aspect may be determined, for example, by analysis or by experiment.

According to one aspect of the invention, in the coolant processing apparatus having the configuration that causes the sludge to be accumulated, the first reservoir may have a shape or a structure that causes the sludge to be accumulated in a specific area.

The configuration of this aspect causes the sludge to be accumulated in the specific area. This configuration advantageously further facilitates, for example, collection of the sludge and cleaning.

The specific area herein may not be necessarily a strict area having distinct boundaries. It is only necessary that the first reservoir has a specific area where the sludge is more likely to be accumulated. This specific area may be formed by adjusting, for example, the height of the boundary wall, the internal shape or configuration of the first reservoir, the shape or configuration of a bottom surface of the first reservoir, and a flow path of the coolant flowing into the first reservoir by experiment or by analysis.

According to one aspect of the invention, in the coolant processing apparatus of the above aspect, the boundary wall may be provided at a location on a downstream side of a bend of the flow of the discharged coolant that is bent once or a plurality of times in a horizontal direction in the first reservoir.

Bending the flow of the coolant in the first reservoir lowers the flow velocity of the coolant and enables the sludge to effectively stay in the first reservoir. Providing the boundary wall at the location on the downstream side of the bend of the flow reduces the flow velocity in the vicinity of the boundary wall and thereby enables the supernatant of the coolant to flow out from the first reservoir with keeping the sludge stay in the first reservoir.

In the coolant processing apparatus of this aspect, the angle and the number of times of bending the flow may be determined arbitrarily. The smaller number of times of bending simplifies the structure, whereas the larger number of times of bending sufficiently lowers the flow velocity. The number of times of bending the flow may be determined by taking into account such advantages.

According to one aspect of the present invention, the coolant processing apparatus of the above aspect may further comprise a sludge collection pump placed on an upstream side of the boundary wall in the first reservoir to collect the sludge precipitating in the first reservoir.

The configuration of this aspect enables the sludge staying in the first reservoir to be collected. Even when the entire sludge staying in the first reservoir is not collectable by the sludge collection pump, this configuration of providing the sludge collection pump advantageously reduces the amount of the sludge staying in the first reservoir and reduces the possibility that the sludge rides over the boundary wall and flows out to the second reservoir.

In the coolant processing apparatus of this aspect, the type, the structure and the location of the sludge collection pump may be determined arbitrarily. The number of the sludge collection pump provided in the coolant processing apparatus is not limited to one sludge collection pump but may be a plurality of sludge collection pumps.

In the coolant processing apparatus according to the above aspect of the present disclosure, however, the sludge collection pump is not an essential component. The sludge that precipitates and that is accumulated in the first reservoir may be collected by cleaning the first reservoir.

According to one aspect of the invention, in the coolant processing apparatus provided with the sludge collection pump, the first reservoir may have a shape or a structure that causes the sludge to be accumulated in a specific area, and the sludge collection pump may be provided in the specific area in the first reservoir. The configuration of this aspect enables the sludge to be collected efficiently.

In the case of collecting the sludge by means of the sludge collection pump, the state that the sludge floats and drifts in the coolant may be preferable over the state that the sludge is fully accumulated. By taking into account such situation, the sludge collection pump may be provided at a location where the coolant flows at a flow velocity that is equal to or higher than a certain level of flow velocity that does not cause precipitation of the sludge, in the first reservoir. The sludge floats and drifts in the coolant at a location where the flow velocity of the coolant is equal to or higher than a predetermined value. This configuration thus enables the sludge to be collected effectively.

For example, in the case where the boundary wall is provided at the location on the downstream side of the bend of the coolant of the discharged coolant that is bent once or a plurality of times in the horizontal direction in the first reservoir, the sludge collection pump may be placed at a location that has a shorter distance to the boundary wall than a distance to the bend of the flow, i.e., at a location nearer to the bend of the flow than the boundary wall.

In the coolant processing apparatus of the above aspect, the boundary wall is provided on the downstream side of the location where the flow of the coolant is bent to decrease the flow velocity. In this state, the location nearer to the bend of the flow than the boundary wall has the higher flow velocity of the coolant and is thus suitable to place the sludge collection pump. From this standpoint, in the coolant processing apparatus of the above aspect, the sludge collection pump is placed at a location nearer to the bend of the flow than the boundary wall, i.e., on a bend-of-the-flow side of a midpoint between the boundary wall and the bend of the flow. This configuration causes the sludge collection pump to be placed at a location having a relatively high flow velocity of the coolant in the first reservoir and enables the sludge to be effectively collected.

According to one aspect of the invention, in the coolant processing apparatus provided with the sludge collection pump, the sludge collection pump may have an inlet port that is configured to suck the coolant upward. The coolant processing apparatus may further comprise an agitation plate provided at a location opposed to the inlet port on a bottom surface of the first reservoir and configured to suppress stagnation of the flow of the coolant to the sludge collection pump.

In the case where the sludge is sucked upward through the inlet port, a flow of the coolant from the periphery toward the inlet port is generated on a surface opposed to the inlet port. A point corresponding to the center of the inlet port is, however, likely to cause stagnation of the flow. In the coolant processing apparatus of this aspect, the agitation plate is provided at this point so suppress stagnation of the flow. This configuration suppresses precipitation and accumulation of the sludge and enables the sludge to be effectively collected.

The agitation plate may be in any of various shapes. For example, when the inlet port has a circular shape, the agitation plate may be an axisymmetric three-dimensional member having a sectional area monotonically decreasing from a bottom surface toward a top. Examples of such a three-dimensional member includes a cone and a paraboloidal surface. The diameter, the height and the like of such a three-dimensional member may be determined arbitrarily.

According to one aspect of the present invention, the coolant processing apparatus provided with the sludge collection pump may further comprise a separator configured to separate the sludge from the coolant collected by the sludge collection pump. The configuration of this aspect enables the coolant after separation of the sludge to be recycled and reused. Any of various devices may be used for the separator. For example, a cyclone device may be used for the separator.

According to one aspect of the present invention, the coolant processing apparatus provided with the separator may further comprise an injection port configured to inject the coolant after separation of the sludge by the separator, to a portion where the flow of the coolant has a lower flow velocity than a flow velocity of the coolant in a peripheral portion thereof. The configuration of this aspect forms the flow of the coolant in the tank by injection of the coolant and thereby assists circulation of the coolant.

In the coolant processing apparatus of the above aspect, the injection port may be provided in the second reservoir. The coolant after removal of the sludge is retained in the second reservoir. There is, however, a possibility that a tiny amount of fine sludge that does not cause a substantial trouble in processing or machine working is left in the coolant. Such sludge may precipitate and be accumulated in a portion having a low flow velocity of the coolant in the second reservoir. This configuration enables the coolant to be injected to this portion and thereby prevents accumulation of the sludge. The coolant after separation of the sludge is reused for this purpose. This cuts the waste.

According to one aspect of the present invention, the coolant processing apparatus of the above aspect may further comprise a coolant feeding-in pump provided in the second reservoir and configured to collect the coolant. The configuration of this aspect enables the coolant after removal of the sludge to be reused for processing or machine working. The position and the number of the coolant feeding-in pumps may be set arbitrarily.

The present invention does not have to include all of the aspects and features as described above. Part of these features may be appropriately omitted, and one or more aspects and features may be appropriately adopted in combination.

DETAILED DESCRIPTION OF EMBODIMENTS OF THE INVENTION

Figure 1A:
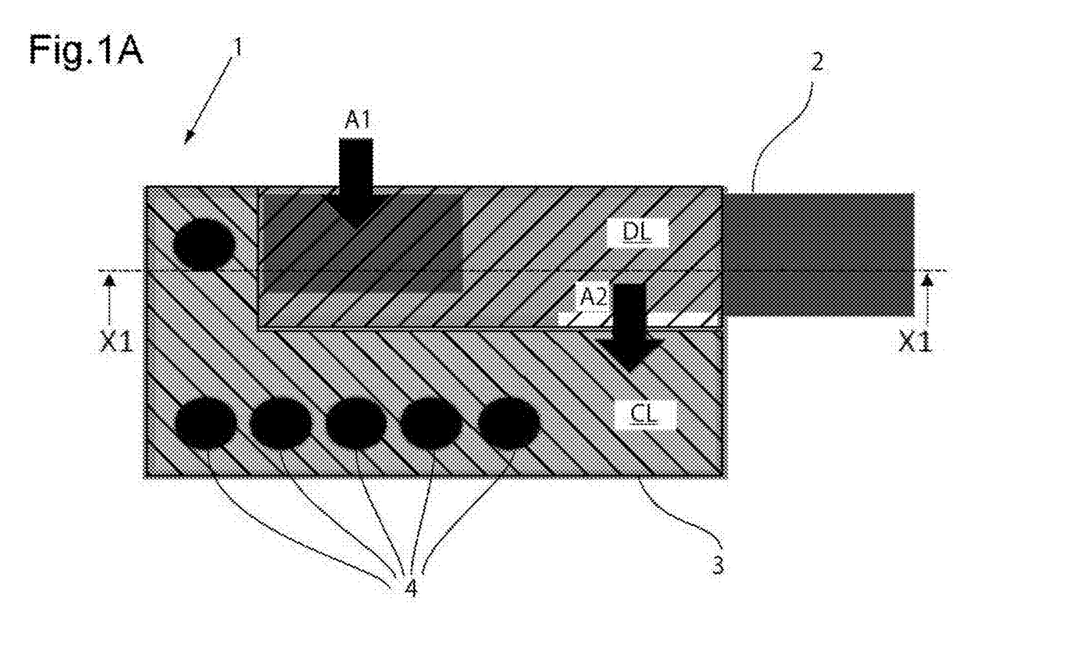
FIGS. 1A and 1B are explanatory plan view and cross-sectional view, respectively, schematically illustrating the general configuration of a conventional coolant processing apparatus.
Figure 1B:
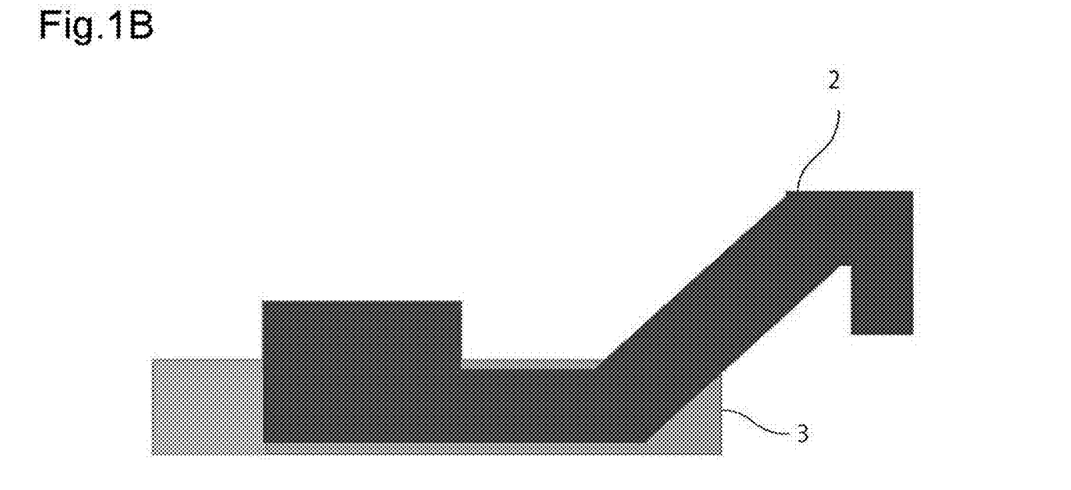

FIGS. 1A and 1B are explanatory views illustrating the general configuration of a conventional coolant processing apparatus 1. FIG. 1A illustrates the outline of a planar configuration, and FIG. 1B illustrates the outline of an X1-X1 sectional configuration.

A coolant used in a machine tool is flowed along with chips and sludge into the coolant processing apparatus 1 as shown by an arrow A1 in FIG. 1A. A filter and a chip conveyor 2 configured to discharge the chips are provided inside of the coolant processing apparatus 1. The coolant after removal of the chips and relatively large sludge by means of the filter is flowed out to a tank 3 as shown by an arrow A2.

As shown in FIG. 1A, inside of the coolant processing apparatus 1 is roughly divided into two areas DL and CL. The area DL is an area where the coolant prior to the removal of the chips and the like by means of the filter is kept and retained and is called a dirty layer. The area CL is an area where the coolant after the removal of the chips and the like by means of the filter is kept and retained and is called a clean layer. As shown in FIG. 1A, a plurality of pumps 4 are provided in the clean layer and serve to circulate and return the coolant to the machine tool.

Part of the sludge included in the coolant is, however, fine sludge that is not removable by the filter. The coolant including such fine sludge is retained in the clean layer CL. Circulation of the coolant including the fine sludge to the machine tool is likely to cause troubles or problems, such as reduction of the processing quality and acceleration of the wear of the tool. The accumulation of the sludge in the clean layer CL requires cleaning of the entire area corresponding to the clean layer CL. Such cleaning imposes an extremely heavy load. A coolant processing apparatus according to an embodiment of the present disclosure described below aims to solve these problems.

Figure 2:
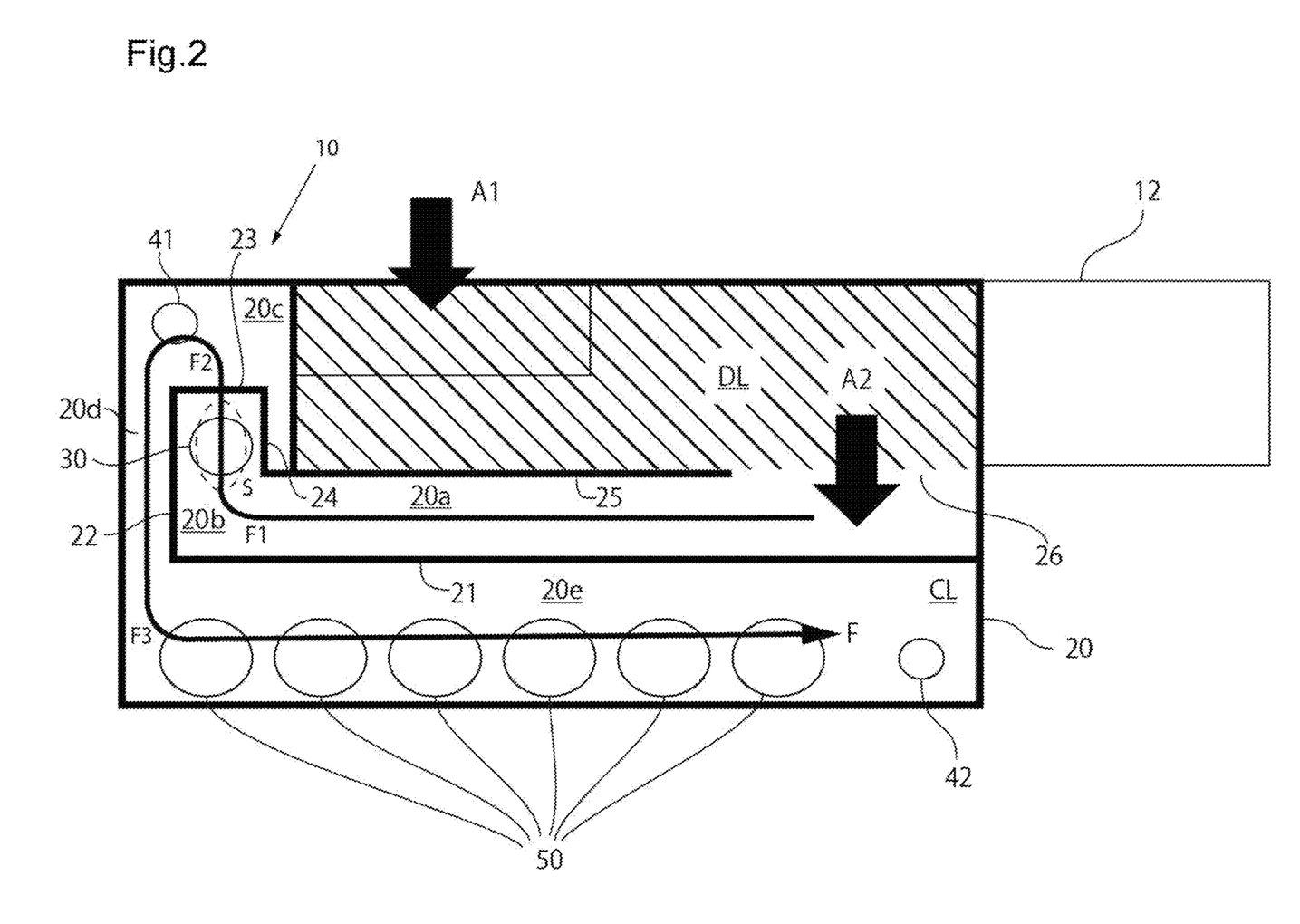
FIG. 2 is an explanatory plan view schematically illustrating the configuration of a coolant processing apparatus according to one embodiment of the present invention.

FIG. 2 is an explanatory view illustrating the general configuration of a coolant processing apparatus 10 according to one embodiment. The general configuration of the coolant processing apparatus 10 according to the embodiment is similar to that of the prior art coolant processing apparatus 1 (shown in FIGS. 1A and 1B). One advantage of the configuration of this embodiment is to provide the coolant processing apparatus 10 of the embodiment by taking advantage of the configuration of the prior art coolant processing apparatus 1 with some modification of the internal structure thereof.

As in the case of the prior art configuration, a coolant used in a machine tool is flowed along with chips and sludge into the coolant processing apparatus 10 as shown by an arrow A1. While the chips are discharged by a chip conveyor 12, the coolant after removal of the chips and relatively large sludge by means of a filter is flowed out to a tank 20 as shown by an arrow A2. Inside of the coolant processing apparatus 10 is divided into a dirty layer DL and a clean layer CL, like the prior art configuration (shown in FIGS. 1A and 1B). In the tank 20 illustrated in FIG. 2, a hatched part indicates the dirty layer DL, and a remaining part indicates the clean layer CL.

Inside of the clean layer CL is separated into two areas called a first reservoir and a second reservoir by partition plates 21, 22, 24 and 25 and a boundary wall 23. The partition plate 25 has an inlet port 26 that is formed to allow the coolant to flow into from the dirty layer DL.

The clean layer CL is divided into a plurality of areas by these partition plates 21, 22, 24 and 25 and the boundary wall 23. An area 20a is a portion defined by the partition plates 21 and 25 to form a flow path of the coolant flowing from the dirty layer DL to the clean layer CL. An area 20b is a portion defined by the partition walls 21, 22, and 24 and the boundary wall 23 to keep and retain the coolant therein. The areas 20a and 20b configure the first reservoir. As described above, sludge stays in this first reservoir.

As illustrated, the coolant flowing out from the inlet port 26 as shown by the arrow A2 flows as shown by an arrow F. After the flow of the coolant is bent at a bend or flexure F1, the coolant is retained in the first reservoir defined by the partition plates 21, 22, 24 and 25 and the boundary wall 23. Retaining the coolant causes fine sludge included in the coolant to stay in the first reservoir. More specifically, part of the sludge precipitates in the first reservoir, whereas the remaining sludge floats and drifts in the coolant and gradually sinks down. A supernatant portion is accordingly the coolant that contains almost no sludge.

The boundary wall 23 is lower than the partition plates 21, 22 and 24 and thereby enables the clear supernatant of the coolant that contains almost no sludge to flow out. This coolant changes the flow direction thereof at bends or flexures F2 and F3 and flows in a flow path formed outside of the partition plates 22 and 21 as shown by the arrow F. A portion after the coolant is flowed out from the boundary wall 23 is called the second reservoir.

As described above, in the coolant processing apparatus 10 of the embodiment, the sludge stays in the first reservoir. In the case of cleaning the inside of the tank, a cleaning procedure accordingly requires detachment of a cover corresponding to only the first reservoir and does not require detachment of a cover corresponding to the entire clean layer CL for cleaning. This configuration thus advantageously reduces the cleaning load.

In the first reservoir, the boundary wall 23 is provided ahead of the bend or flexure F1 where the flow of the coolant from the area 20a to the area 20b is bent. In other words, the boundary wall 23 is provided at a location where the flow velocity of the coolant flowing from the area 20a is lowered. This configuration prevents the sludge staying in the coolant retained in the first reservoir from rolling up and riding over the boundary wall 23 to flow out.

Changing the height of the boundary wall 23 changes the flow and the flow velocity of the coolant in the first reservoir and changes the behavior of the sludge in the first reservoir. Accordingly, the height of the boundary wall 23 may be determined by analysis or by experiment by taking into account the flow velocity of the coolant and the size of the sludge, with a view to allowing only the supernatant to flow out. The height of the boundary wall 23 may be adjusted to cause the sludge to be accumulated in a predetermined area S in the first reservoir.

The shapes, the configurations and the like of the partition plates 21, 22, 24 and 25, in addition to the height of the boundary wall 23, may be adjusted in order to control the behaviors of the sludge as intended, for example, in order to cause the sludge to stay in the first reservoir and to be accumulated in the predetermined area S.

A sludge collection pump 30 is provided inside of the first reservoir to collect the staying sludge. The position of the sludge collection pump 30 may be determined arbitrarily but is provided in the area S where the sludge is accumulated, in the first reservoir according to the embodiment. In the illustrated example, the area S is present at a location in the vicinity of the boundary wall 23, so that the sludge collection pump 30 is provided at this location. In the case where the area S where the sludge is accumulated is present at a location farther from the boundary wall 23, the position of the sludge collection pump 30 is accordingly farther from the boundary wall 23.

In terms of preventing the sludge from riding over the boundary wall 23 to flow out, however, it is preferable that the area S where the sludge is accumulated is present at a location farther from the boundary wall 23.

With a view to effectively collecting the sludge by using the sludge collection pump 30, the sludge collection pump 30 may be provided at a location where the flow velocity of the coolant is kept at a certain level that does not cause the sludge to fully precipitate. This location may be determined, for example, by experiment or by analysis. For example, the sludge collection pump 30 may be provided at a location near to the bend or flexure F1 of the flow of the coolant (shown in FIG. 2).

An area 20c is an area defined by the boundary wall 23 and an outer wall of the tank 20. An area 20d is an area defined by the partition plate 22 and the outer wall of the tank 20. An area 20e is an area defined by the partition plate 21 and the outer wall of the tank 20. These areas 20c, 20d and 20e are areas where the coolant flowing out from the first reservoir is retained and configure the second reservoir.

Injection ports 41 and 42 of the coolant are respectively provided in the areas 20c and 20e of the second reservoir. The purified coolant after collection of the sludge by the sludge collection pump 30 and removal of the sludge by a cyclone device described later is circulated to these areas 20c and 20e.

The positions of the injection ports 41 and 42 may be set arbitrarily, but the injection ports 41 and 42 are provided at locations where the flow velocity of the coolant is more likely to be lowered inside of the second reservoir according to this embodiment. This configuration suppresses stagnation of the coolant in the second reservoir.

The coolant after removal of the sludge is retained in the second reservoir. There is, however, a possibility that a tiny amount of fine sludge that does not cause a substantial trouble in processing or machine working is left in the coolant. Providing the injection ports 41 and 42 at the locations where the flow velocity of the coolant is more likely to be lowered according to the embodiment suppresses the flow velocity of the coolant from being lowered and prevents accumulation of the sludge.

A plurality of coolant feeding-in pumps 50 are provided in the area 20e of the second reservoir. The coolant after sufficient removal of the sludge in the first reservoir is collected by the coolant feeding-in pumps 50 to be recycled to and reused in the machine tool. The number and the locations of the coolant feeding-in pumps 50 may be determined arbitrarily. The configuration of the embodiment that provides the first reservoir and the second reservoir in the tank of the coolant to allow for removal of the fine sludge prevents troubles caused by the inflow of the coolant including the sludge into the machine tool.

Figure 3:
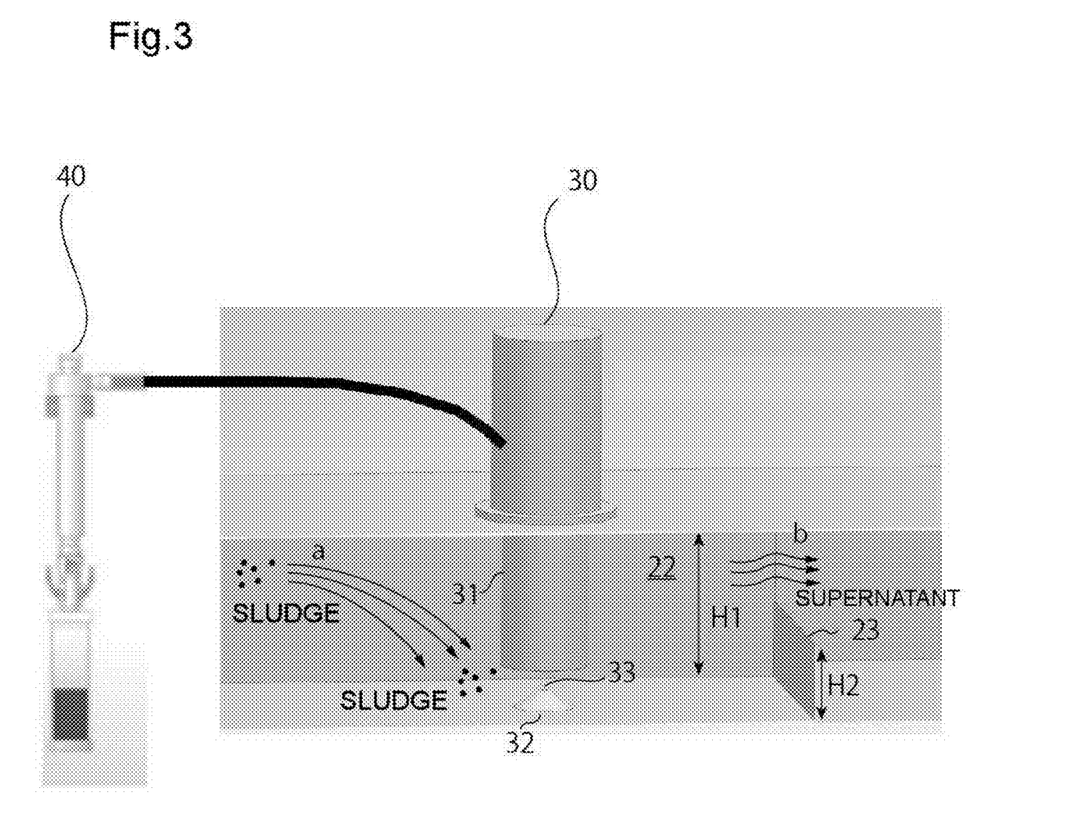
FIG. 3 is an explanatory view schematically illustrating the general configuration of a sludge collection pump.

FIG. 3 is an explanatory view schematically illustrating the general configuration of the sludge collection pump 30. The right side of the drawing shows the state in the vicinity of an inlet port 31 of the sludge collection pump 30 placed in the area 20b. The inlet port 31 of the sludge collection pump 30 is formed in a cylindrical shape and is attached to suck the coolant vertically upward relative to a bottom surface of the tank 20.

An agitation plate 32 is provided at a position opposed to the inlet port 31 on the bottom surface of the tank 20. The agitation plate 32 may be formed in a cone-like shape as illustrated. The shape of the agitation plate 32 is, however, not limited to the illustrated example but may be any of various shapes having a gradually decreasing sectional area in a circular cross section. A projection 33 in a columnar shape may be added to the top of the agitation plate 32 as illustrated.

The flow of the coolant is likely to stagnate at a location corresponding to a central axis of the inlet port 31. Providing the agitation plate 32 as illustrated prevents stagnation of the flow of the coolant in the vicinity of the center of the inlet port 31 or prevents the flow velocity of the coolant from being lowered in the vicinity of the center of the inlet port 31 and thereby enables the sludge to be effectively collected.

As described above, according to the embodiment, the boundary wall 23 has a height H2 that is lower than a height H1 of the partition wall 22. This configuration allows only the supernatant of the coolant to flow out of the boundary wall 23 as shown by arrows b. Providing the boundary wall 23 in such settings lowers the flow velocity of the coolant and causes the sludge included in the coolant to sink down as shown by arrows a and to be accumulated in a predetermined area. According to this embodiment, the coolant with the accumulated sludge is collected by the sludge collection pump 30. In the drawing, the height H2 looks like almost half the height H1. This is, however, only illustrative and does not intend to limit the height of the boundary wall 23 to this height range.

The coolant collected by the sludge collection pump 30 is flowed into a cyclone device 40 that is configured to separate the sludge from the coolant by taking advantage of the centrifugal force. The separated sludge is discharged from the cyclone device 40 by opening a drain valve (not shown). The coolant after removal of the sludge is injected through the injection ports 41 and 42 (shown in FIG. 2) into the tank 20.

The cyclone device 40 is used for separation of the sludge according to the embodiment, but another mechanism may be employed for separation of the sludge. In the case where there is no need to recycle and reuse the coolant after separation of the sludge, the cyclone device 40 may be omitted, and the coolant with the accumulated sludge may be discarded.

Figure 4A:
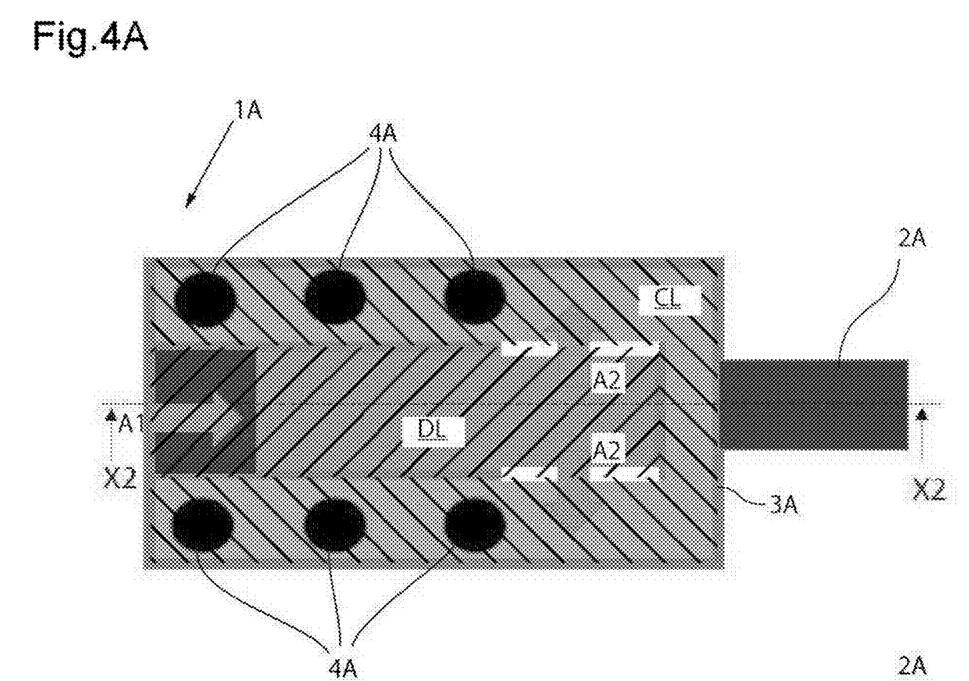
FIGS. 4A and 4B are explanatory plan view and cross-sectional view, respectively, schematically illustrating the general configuration of another conventional coolant processing apparatus.
Figure 4B:
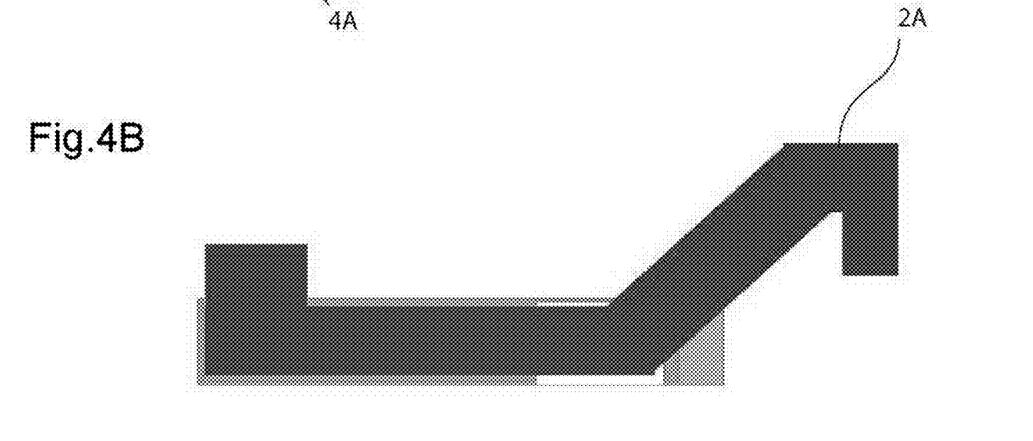

FIGS. 4A and 4B are explanatory views illustrating the general configuration of another prior art coolant processing apparatus 1A. The coolant processing apparatus 1A of FIGS. 4A and 4B has a different configuration from that of the coolant processing apparatus 1 of FIGS. 1A and 1B. FIG. 4A illustrates the outline of a planar configuration, and FIG. 4B illustrates the outline of an X2-X2 sectional configuration.

In the coolant processing apparatus 1A, a chip conveyor 2A is placed at the approximate center in planar view as shown in FIG. 4A. A coolant is flowed into the coolant processing apparatus 1A as shown by an arrow A1 and flows out from both sides of the chip conveyor 2A into a tank 3 as shown by arrows A2. Chips and relatively large sludge are removed by filters from the respective flows of the coolant, like the coolant processing apparatus 1 shown in FIGS. 1A and 1B.

Accordingly, an area prior to the outflow of the coolant as shown in the arrows A2 is a dirty layer DL, and an area after the outflow is a clean layer CL. A plurality of pumps 4A for collection of sludge are provided in the clean layer CL.

Figure 5:
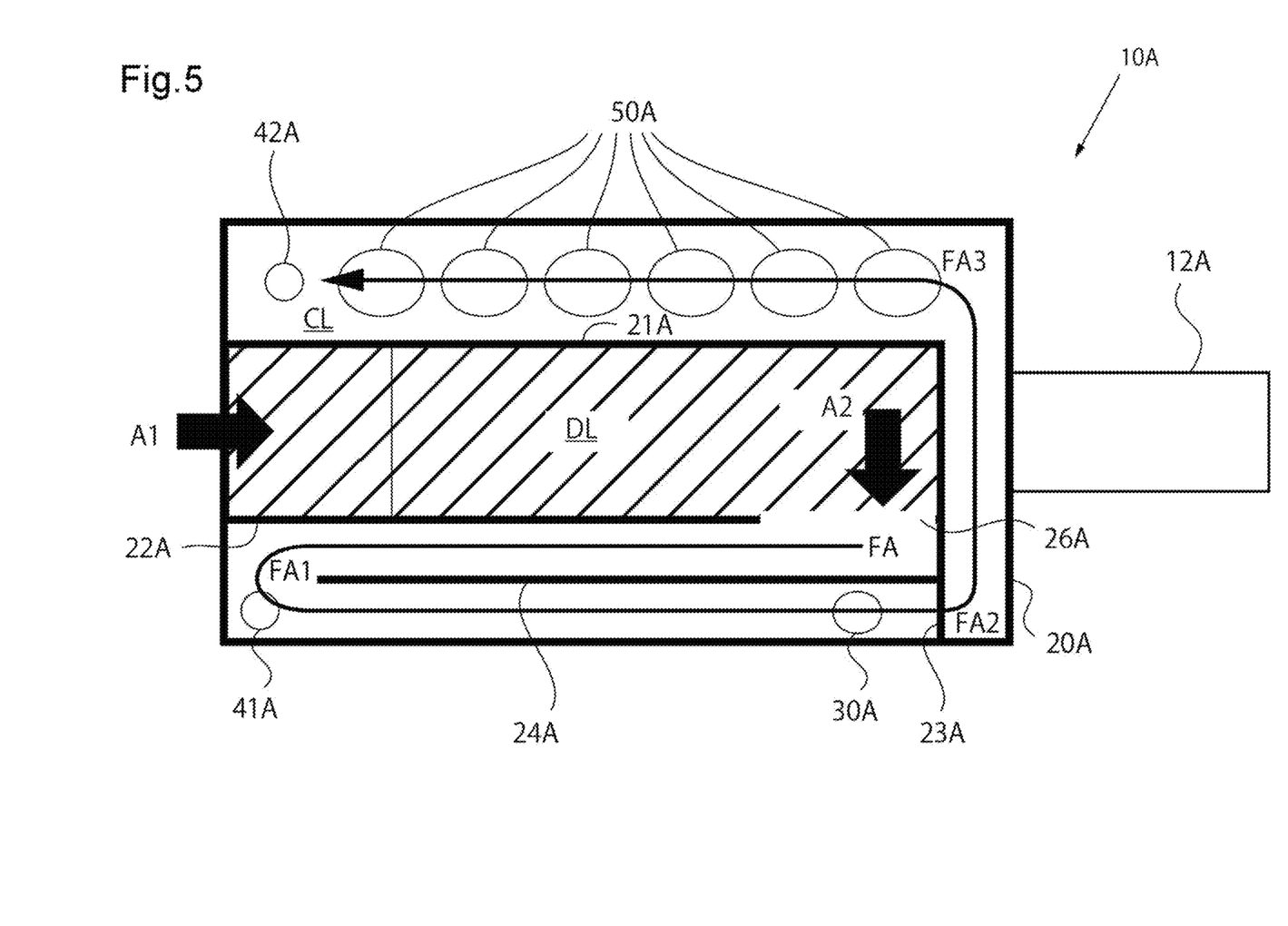
FIG. 5 is an explanatory plan view schematically illustrating the configuration of a coolant processing apparatus according to another embodiment of the present invention.

FIG. 5 is an explanatory plan view schematically illustrating the configuration of a coolant processing apparatus 10A according to a modification. The coolant processing apparatus 10A of the modification is implemented by modifying the internal structure of the coolant processing apparatus 1A shown in FIGS. 4A and 4B.

A partition plate 21A is placed such as to form only one inlet port 26A which the coolant is flowed through from a dirty layer DL into a clean layer CL. As a result, the coolant flows through the one inlet port 26A into the clean layer CL as shown by an arrow A2. Discharge of chips and relatively large sludge by a chip conveyor 12A and removal of the chips and the relatively large sludge by a filter are similar to those described above in the embodiment.

In the clean layer CL, a first reservoir is formed by partition plates 22A and 24A and a boundary wall 23A. The coolant in the first reservoir flows as shown by an arrow FA to be bent at a bend or flexure FA1 and subsequently flow toward the boundary wall 23A with decreasing the flow velocity.

Like the embodiment described above, adjustment of the height of the boundary wall 23A causes the sludge to stay in the first reservoir and enables only the supernatant to flow out to the downstream of the boundary wall 23A, i.e., to a second reservoir. Adjusting the height of the boundary wall 23A and the shape, the configuration and the like of the partition wall 24A enables the sludge to be accumulated in a predetermined area in the first reservoir.

A sludge collection pump 30A is provided in the first reservoir. As in the embodiment described above, the sludge collection pump 30A is placed at a location where sludge is accumulated in the first reservoir. The coolant collected by the sludge collection pump 30A is subjected to separation of the sludge by means of a cyclone device and is then returned into a tank 20A through injection ports 41A and 42A.

In the configuration of the embodiment, the injection ports 41 and 42 are provided in the second reservoir (as shown in FIG. 2). As in the configuration of this modification, however, the injection port 41A may be provided in the first reservoir, and the injection port 42A may be provided in the second reservoir. This configuration enables the injection ports 41A to be used to control the flow of the coolant in the first reservoir. The arrangement of the injection ports is, however, not limited to the illustrated example. Both the injection ports may be provided in the first reservoir or may be provided in the second reservoir.

Pumps 50A for collection of the coolant are placed in the second reservoir. The coolant collected by these pumps 50A is circulated to the machine tool.

Figure 6A:
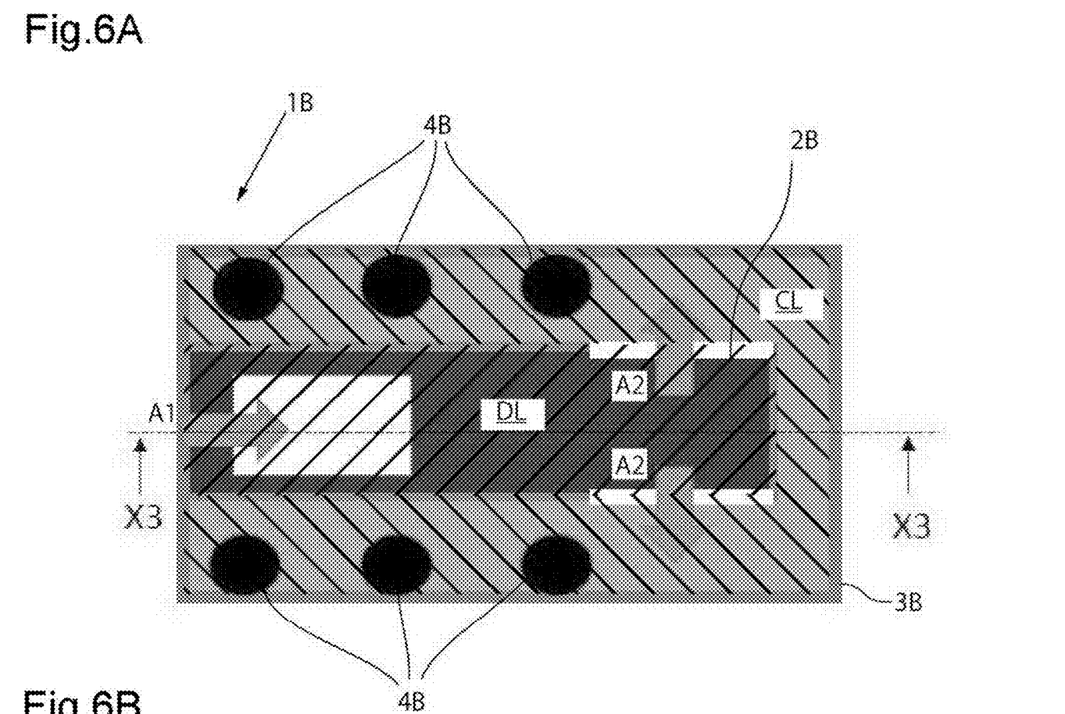
FIGS. 6A and 6B are explanatory plan view and cross-sectional view, respectively, schematically illustrating the general configuration of another conventional coolant processing apparatus.
Figure 6B:
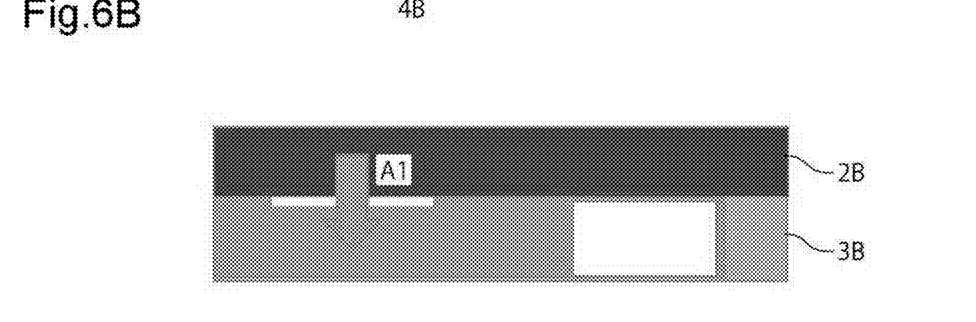

FIGS. 6A and 6B are explanatory views illustrating the general configuration of another prior art coolant processing apparatus 1B. FIG. 6A illustrates the outline of a planar configuration, and FIG. 6B illustrates the outline of an X3-X3 sectional configuration.

In the coolant processing apparatus 1B, a chip conveyor 2B is placed at the approximate center in planar view and on an upper side of a tank 3B as shown in FIG. 6A. A coolant is flowed into the coolant processing apparatus 1B as shown by an arrow A1, flows below the chip conveyor 2B, and flows out from both sides of the chip conveyor 2B into the tank 3B as shown by arrows A2. Chips and relatively large sludge are removed by filters from the respective flows of the coolant, like the coolant processing apparatus 1 shown in FIGS. 1A and 1B. Accordingly, an area prior to the outflow of the coolant as shown in the arrows A2 is a dirty layer DL, and an area after the outflow is a clean layer CL. A plurality of pumps 4B for collection of sludge are provided in the clean layer CL.

Figure 7:
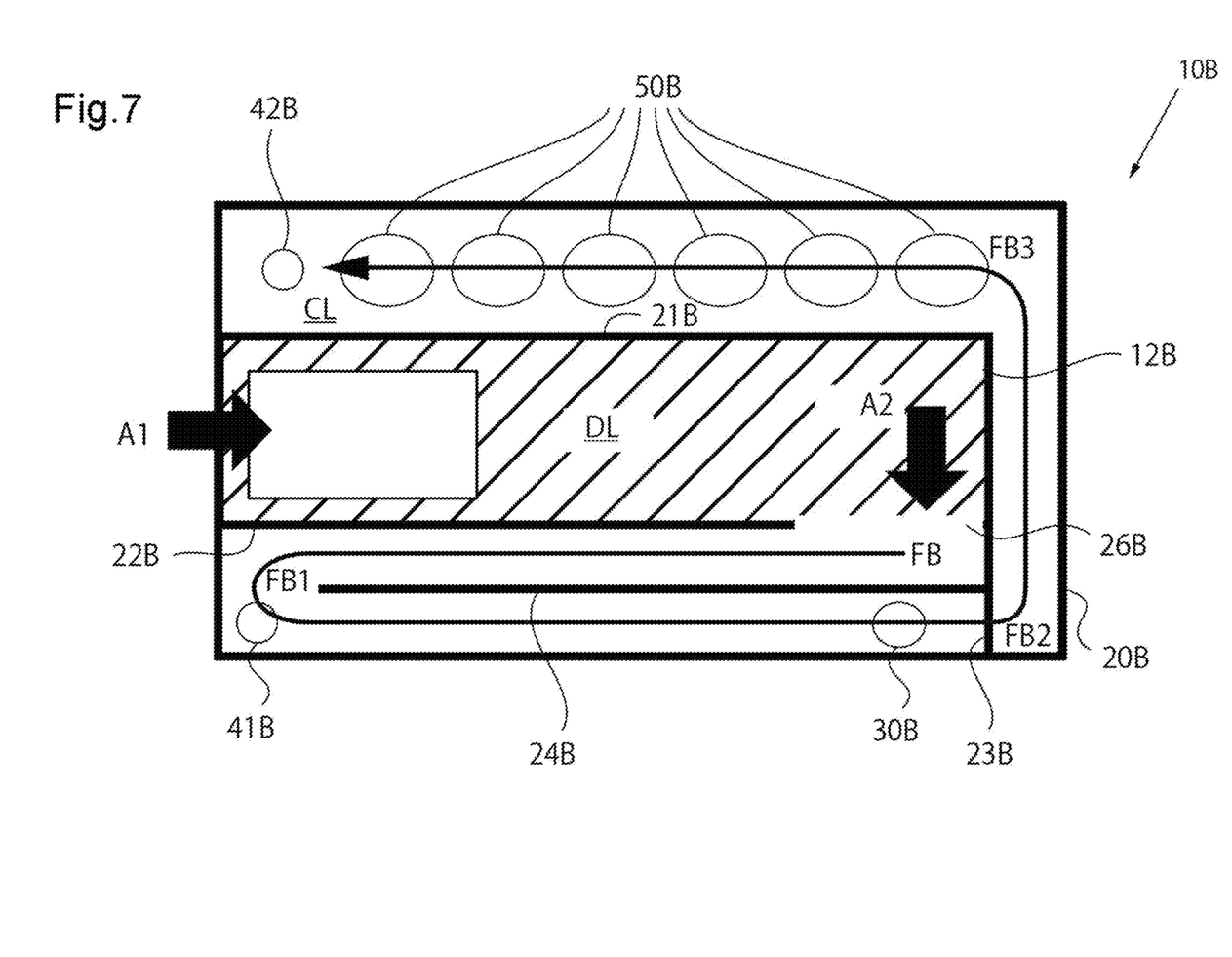
FIG. 7 is an explanatory plan view schematically illustrating the configuration of a coolant processing apparatus according to another embodiment of the present invention.

FIG. 7 is an explanatory view schematically illustrating the planar configuration of a coolant processing apparatus 10B according to a modification. The coolant processing apparatus 10B of the modification is implemented by modifying the internal structure of the coolant processing apparatus 1B shown in FIGS. 6A and 6B.

A partition plate 21B is placed such as to form only one inlet port 26B which the coolant is flowed through from a dirty layer DL into a clean layer CL. As a result, the coolant flows through the one inlet port 26B into the clean layer CL as shown by an arrow A2. Discharge of chips and relatively large sludge by a chip conveyor 12B and removal of the chips and the relatively large sludge by a filter are similar to those described above in the embodiment.

In the clean layer CL, a first reservoir is formed by partition plates 22B and 24B and a boundary wall 23B. The coolant in the first reservoir flows as shown by an arrow FB to be bent at a bend or flexure FB1 and subsequently flow toward the boundary wall 23B with decreasing the flow velocity.

Like the embodiment described above, adjustment of the height of the boundary wall 23B causes the sludge to stay in the first reservoir and enables only the supernatant to flow out to the downstream of the boundary wall 23B, i.e., to a second reservoir. Adjusting the height of the boundary wall 23B and the shape, the configuration and the like of the partition wall 24B enables the sludge to be accumulated in a predetermined area in the first reservoir.

A sludge collection pump 30B is provided in the first reservoir. As in the embodiment described above, the sludge collection pump 30B is placed at a location where sludge is accumulated in the first reservoir. The coolant collected by the sludge collection pump 30B is subjected to separation of the sludge by means of a cyclone device and is then returned into a tank 20B through injection ports 41B and 42B.

In the configuration of the embodiment, the injection ports 41 and 42 are provided in the second reservoir (as shown in FIG. 2). As in the configuration of this modification, however, the injection port 41B may be provided in the first reservoir, and the injection port 42B may be provided in the second reservoir. This configuration enables the injection ports 41B to be used to control the flow of the coolant in the first reservoir. The arrangement of the injection ports is, however, not limited to the illustrated example. Both the injection ports may be provided in the first reservoir or may be provided in the second reservoir.

Pumps 50B for collection of the coolant are placed in the second reservoir. The coolant collected by these pumps 50B is circulated to the machine tool.

The coolant processing apparatus according to any of the embodiment and the modifications thereof described above causes the fine sludge included in the clean layer to stay in the first reservoir and thereby effectively removes the sludge. Another advantage is to achieve such effects by the simple configuration of dividing the inside of the tank into the first reservoir and the second reservoir, with taking advantage of the prior art tank structure for the coolant.

All the various features described in the above embodiment and modifications are not essential, but part of these features may be appropriately omitted or may be appropriately used in combination. The present disclosure is not limited to the embodiment or the modifications thereof described above but may be implemented by various other modifications.

For example, the position of the boundary wall 23, 23A or 23B is not limited to the location described in the embodiment or in the modification. The boundary wall 23, 23A or 23B is configured to have the height that is uniformly lower than the height of the partition plate 22 as shown in FIG. 3. This configuration may, however, be determined arbitrarily. The boundary wall may have a configuration including a lower center portion and higher end portions or may have a configuration of changing the height in an arc shape. The boundary wall may not be necessarily a flat plate but may be formed in another shape or configuration, for example, to have a curved surface including a center portion protruded toward the first reservoir side or toward the second reservoir side or to have a bent surface.

Furthermore, the boundary wall 23 may not be placed perpendicular to the bottom surface but may be placed obliquely, for example, to be inclined to the first reservoir side or to be inclined to the second reservoir side.

A variety of designs and settings are available for the dimensions and the shape or the configuration of the first reservoir. It is preferable that the first reservoir has such a capacity that allows a coolant to be retained with sufficiently decreasing the flow velocity of the coolant by taking into account the inflow of the coolant per time into the first reservoir.

What is claimed is:

1. A coolant processing apparatus for removing sludge from a coolant discharged from a machine tool, the coolant containing the sludge flowing into a tank after chips in the coolant are removed by a filter, the coolant processing apparatus comprising:
 a first reservoir provided inside of the tank and configured to retain the discharged coolant such that the sludge remains therein;
 a second reservoir provided adjacent to the first reservoir and configured to retain the coolant flowing out from the first reservoir; and
 a boundary wall provided between the first reservoir and the second reservoir to form a boundary therebetween against a flowing direction of the coolant,
 wherein the first reservoir includes:
  a flow path in which the discharged coolant flows; and
  a portion provided downstream of the flow path and configured to retain the coolant therein,
 wherein the flow path has at least one bend so as to bend a flow of the coolant at least once in a horizontal direction, and
 wherein the boundary wall is disposed at a location downstream of the at least one bend of the flow path, the boundary wall having such a height that allows a supernatant of the coolant in the first reservoir to flow thereover into the second reservoir, while preventing the coolant in the first reservoir from flowing therethrough into the second reservoir.

2. The coolant processing apparatus according to claim 1, wherein the height of the boundary wall is set such that a flow velocity of the coolant in the first reservoir is decreased at least partly in the flow path so as to cause the sludge to accumulate.

3. The coolant processing apparatus according to claim 2, wherein the first reservoir has such a shape or structure that causes the sludge to accumulate in a specific area.

4. The coolant processing apparatus according to claim 1, further comprising:
 a sludge collection pump provided upstream of the boundary wall in the first reservoir to collect the sludge accumulated in the first reservoir.

5. The coolant processing apparatus according to claim 4, wherein the first reservoir has such a shape or structure that causes the sludge to accumulate in a specific area, and the sludge collection pump is provided in the specific area in the first reservoir.

6. The coolant processing apparatus according to claim 4, wherein the sludge collection pump has an inlet port configured to suck the coolant upward, and wherein the coolant processing apparatus further comprises:
an agitation plate provided on a bottom of the first reservoir at a location facing the inlet port, and configured to suppress stagnation of the flow of the coolant to the sludge collection pump.

7. The coolant processing apparatus according to claim 6, wherein the inlet port has a circular shape, and wherein the agitation plate has an axisymmetric three-dimensional shape, a cross section of which has an area monotonically decreasing from a bottom face toward a top.

8. The coolant processing apparatus according to claim 4, further comprising:
a separator configured to separate the sludge from the coolant collected by the sludge collection pump.

9. The coolant processing apparatus according to claim 8, further comprising:
an injection port from which the coolant after separation of the sludge by the separator is injected, the injection port being provided in at least one of the first reservoir and the second reservoir to control the flow of the coolant at a location where the flow velocity of the coolant reduces.

10. The coolant processing apparatus according to claim 1, further comprising:
a coolant collection pump provided in the second reservoir and configured to collect the coolant and return to the machine tool.

* * * * *